Patented Sept. 4, 1951

2,567,011

UNITED STATES PATENT OFFICE 2,567,011

FLUOROCARBON ACIDS AND DERIVATIVES

Albert R. Diesslin and Edward A. Kauck, St. Paul, Minn., and Joseph H. Simons, State College, Pa., assignors to Minnesota Mining & Manufacturing Company, St. Paul, Minn., a corporation of Delaware No Drawing. Application January 10, 1949, Serial No. 70,154

6 Claims. (Cl. 260—465.7)

This invention relates to our discovery of a new and useful class of reactive fluorocarbon derivative compounds having novel properties and further useful as chemical intermediates.

Our new fluorocarbon compounds are fluorocarbon monocarboxylic acids and derivatives which are reactive and contain a saturated fluorocarbon radical having at least three carbon atoms. These compounds possess decided fluorocarbon characteristics combined with properties attributable to the active non-fluorocarbon group associated therewith.

The compounds herein disclosed can be generically represented by the class formula:

R—Z where R is a saturated polycarbon fluorocarbon radical (cyclic or non-cyclic) containing at least three carbon atoms, and Z is a monocarboxyl radical or a carbon-containing derivative radical hydrolyzable thereto. These compounds are the monocarboxylic acids and the derivatives which upon hydrolysis yield the acids; such as acid anhydrides, acid halides (fluorides, chlorides, bromides and iodides), amides, N-substituted amides, nitriles, alkyl esters, salts, and the like.

Saturated fluorocarbons (carbon fluorides consisting solely of carbon and fluorine atoms) are highly stable and inert, and cannot serve as reactive starting compounds for making the present fluorocarbon derivatives.

We have discovered that a simple and economical way of making these compounds is to prepare the saturated fluorocarbon acid fluoride compounds:

(where R has the meaning above stated), by a direct electrochemical method (as hereinafter described in more detail), and then utilize these highly reactive compounds (RCOF) as starting compounds for making the derivatives which are likewise embraced by the previously stated generic formula. These derivatives include the acids (R—COOH) and acid anhydrides, and their corresponding alkyl esters and salts, the amides (R—CONH$_2$) and the N-substituted amides, the nitriles (R—CN), and the other acid halides (R—COX) in addition to the acid fluorides (i. e. acid chlorides, acid bromides and acid iodides). The term "alkyl ester" has reference to an ester derivative of the fluorocarbon acid wherein the oxygen-bonded hydrogen atom has been replaced by an alkyl radical, such as results when the acid is reacted with an alcohol.

The saturated polycarbon fluorocarbon radical, represented by "R" in the foregoing formulae, can be of the open chain (non-cyclic) type, normal or branched, and can also be of the closed chain (cyclic) type, and in the latter case the radical can be either a simple ring or a combination of cyclic and non-cyclic sub-radicals. The non-cyclic chain radicals have the formula: $C_nF_{2n+1}$, where $n$ is 3 or a higher integer. The cyclic radicals have the formula: $C_nF_{2n-1}$. The recurring chain unit is the —$CF_2$— group.

The presence of a saturated fluorocarbon chain (cyclic or non-cyclic) in the molecule is responsible for these compounds having unique combinations of surface active properties with other desirable physical and chemical properties, in consequence of which they are distinctly different from all previously known carbon compounds in respect to properties and utility as well as composition. When the active group of a molecule is adsorbed at a surface the fluorocarbon chain can project outwardly a substantial distance to provide an exposed fluorocarbon type of "tail." This makes it possible to form surface films which are strongly held to a surface by adsorption and yet are like fluorocarbons in their outward behavior. The fluorocarbon chains do not have an affinity for either water or hydrocarbons. The non-fluorocarbon active end of the molecule, depending upon the particular type of compound, may be hydrophilic or lyophilic. The solubility and wetting properties of the opposite ends of the molecules of the present compounds are disparate and this feature can be utilized in various ways in preparing emulsions and dispersions, surface coatings, and in modifying the surface properties of liquids and solids, etc.

Trifluoroacetic acid ($CF_3COOH$) and its derivatives have previously been known, although the methods of making have been difficult and costly. They do not have a fluorocarbon chain or ring in the molecule. The single fluorinated carbon atom is bonded to an active carbon group and cannot impart the distinctive fluorocarbon properties which the present compounds possess by virtue of having a fluorocarbon radical containing three or more carbon atoms. Thus this acid does not have the distinctive surface active properties possessed by the acids of the present invention.

An incidental advantage in the preparation of the present compounds is that the fluorocarbon acid fluorides with which we are concerned have boiling points near to and above the freezing point of water (0° C.). In contrast, the trifluoroacetic acid fluoride (CF₃COF), trifluoroacetyl fluoride, is a low-boiling gas having a boiling point of about minus 60° C. A further advantageous feature is that our fluorocarbon acids (RCOOH) are high-boiling compounds (having boiling points above 115° C.); and the corresponding amides (RCONH₂) have melting points above 100° C.

Our method of making the fluorocarbon acid fluorides is to electrolyze a solution of anhydrous liquid hydrogen fluoride containing a dissolved hydrocarbon monocarboxylic acid (or its anhydride) of corresponding carbon skeletal structure, by passing a direct current through the solution at a cell voltage which is insufficient to generate molecular (free elemental) fluorine under the existing conditions, but which is sufficient to cause the formation of the fully fluorinated acid fluoride derivative at a useful rate. The fluorocarbon acid fluoride, which results from complete replacement of the carbon-bonded hydrogen atoms, and of the hydroxyl group, by fluorine atoms, is relatively insoluble in the electrolyte solution and either settles to the bottom of the cell from which it can be drained along with other fluorocarbon products of the process, or is volatilized and evolves from the cell in admixture with the hydrogen and other gaseous products. In either case, the desired fluorocarbon acid fluoride can be separated and thus recovered, or it can be converted to a derivative while still mixed with other products and this derivative can be separated and recovered. The latter procedure is generally most convenient due to the relatively low stability and high reactivity of the fluorocarbon acid fluorides; and it is the derivatives thereof which are of primary interest as end products.

Unsaturated and aromatic acid starting compounds can be utilized and saturation will be produced by fluorine addition.

The ethers and amides can also be used as starting compounds in this electrochemical process, although the yield of fluorocarbon acid fluorides is lower than when the carboxylic acids are used.

Excellent results can be obtained with simple single compartment electrolytic cell arrangements. No diaphragm is needed between electrodes. The process is suitable for continuous as well as batch operation. The cell can be operated at atmospheric pressure. The cell and the cathodes can be made of iron or steel, and the anodes or nickel, and such cells have been satisfactorily operated at 5 to 8 volts, D. C.

The electrochemical process of making fluorine-containing carbon compounds is broadly described and claimed in the copending application of one of us, J. H. Simons, Ser. No. 62,496, filed on November 29, 1948, since issued as Patent No. 2,519,983 on August 22, 1950.

The following are representative fluorocarbon acid fluorides which have been prepared by the aforesaid electrochemical process, using the starting compounds listed in the second column:

| Fluorocarbon Acid Fluoride Products | Starting Compounds |
| --- | --- |
| CF₃(CF₂)₂COF (n-heptafluorobutyryl fluoride) | n-butyric acid. n-dibutyl ether. |
| CF₃(CF₂)₄COF (undecafluorocaproyl fluoride) | caproic acid. n-dihexyl ether. |
| CF₃(CF₂)₆COF (pentadecafluorocaprylyl fluoride) | caprylic acid. n-octanamide. |
| CF₃(CF₂)₈COF (nonadecafluorocapryl fluoride) | capric acid. |
| C₆F₁₁COF (undecafluorocyclohexylyl fluoride) | benzoic acid. phenylacetic acid. |
| C₆F₁₁CF₂COF (tridecafluorocyclohexyl acetyl fluoride) | cyclohexylacetic acid. |

The first compound in the above group contains three carbon atoms in the fluorocarbon radical and has a boiling point in the neighborhood of 0° C. The other compounds are normally liquid, boiling above 25° C. The compounds having seven or more carbon atoms in the fluorocarbon radical boil near to or above the boiling point of water (100° C.).

Using the above fluorocarbon acid fluorides as reactive starting compounds, representatives of the various previously mentioned classes of derivatives have been made by chemical methods indicated below and are listed with various physical properties.

*Acids and acid anhydrides*

The fluorocarbon acid fluorides react with water to form the corresponding fluorocarbon acids, wherein the reactive fluorine atom has been replaced by a hydroxyl group (—OH) as illustrated by:

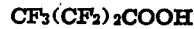

| Acid | B. P. (°C.) | Ref. Index | Density (g./cc.) |
| --- | --- | --- | --- |
| CF₃(CF₂)₂COOH | 119 | 1.293 (at 20° C.) | 1.651 |
| CF₃(CF₂)₄COOH | 156 | 1.298 (at 29° C.) | 1.734 |
| CF₃(CF₂)₆COOH ₁ | 190 | | |
| CF₃(CF₂)₈COOH ₁ | 130 (30 mm.) | | |
| C₆F₁₁COOH | 169 | 1.325 (at 29° C.) | 1.798 |

₁ Solid at room temperature.

The boiling point values given above and hereafter were measured at about 740 mm. pressure except when otherwise noted.

As an illustration, 5 grams of water was added to 150 grams of the cell drainings obtained from the electrolysis of a benzoic acid solution in anhydrous liquid HF, and the mixture was stirred for several hours. Distillation of the mixture gave 77 grams of a fraction boiling in the range 168–170° C., which was identified as C₆F₁₁COOH (undecafluorocyclohexylcarboxylic acid). These fluorocarbon acids are extremely strong, the acid strength of aqueous solutions being of the same order of magnitude as that of the mineral acids, whereas the corresponding hydrocarbon acids are relatively weak acids.

The n-heptafluorobutyric acid

CF₃(CF₂)₂COOH is a water-white liquid with a butyric acid odor. Cooling curve data indicate the presence of at least three distinct hydrates involving 1, 3 and 4 molecules of water. Supplementing the data in the above table, the following additional physical properties are noted: melting point, minus 17.5° C.; boiling point at 10 mm. pressure, 25° C.; molar refractivity, 23.8; surface tension, 17.5 dynes/cm. at 20° C. It is soluble in water, toluene and ethyl ether, and insoluble in heptane. Salts of the acid can be easily prepared. Esters, using primary and secondary alcohols, can be synthesized directly from the acid in the presence or absence of mineral acid catalyst. The acid chloride, $CF_3(CF_2)_2COCl$, can be formed directly by treatment of the acid with phosphorous pentachloride, and the acid bromide.

$$CF_3(CF_2)_2COBr$$

by treatment with phosphorous tribromide.

The acid anhydrides can be readily made by direct interaction of the acid chloride and the sodium salt of the acid, followed by fractionation. As an illustration, n-heptafluorobutyric anhydride, $(C_3F_7CO)_2O$, was made in this way and was found to have the following properties: M. P. minus 43° C., B. P. 106° C., refractive index (at 20° C.) 1.287, density (g./cc. at 20° C.) 1.665, surface tension (dynes/cm. at 20° C.) 15.5.

Acid halides

The fluorocarbon acid fluorides have previously been mentioned, and can be made by the electrochemical process.

The fluorocarbon acid chlorides and bromides can be derived from the fluorocarbon acids (RCOOH) by direct treatment of the acid with phosphorous pentachloride or tribromide, respectively. For example, n-heptafluorobutyric acid, $CF_3(CF_2)_2COOH$, can be reacted with phosphorous pentachloride to yield n-heptafluorobutyryl chloride, $CF_3(CF_2)_2COCl$; and with phosphorous tribromide to yield n-heptafluorobutyryl bromide, $CF_3(CF_2)_2COBr$. The acid iodides can be prepared from the acid chlorides and acid bromides by replacement of the chlorine or bromine with iodine, as by reacting the acid chloride or bromide with calcium iodide. The following table lists properties of the n-heptafluorobutyryl chloride, bromide and iodide:

| Acid Halide | B. P. (°C.) | Density (at 20° C.) |
|---|---|---|
| $CF_3(CF_2)_2COCl$ | 38–39 | 1.55 |
| $CF_3(CF_2)_2COBr$ | 52–53 | 1.735 |
| $CF_3(CF_2)_2COI$ | 75–76 | 2.00 |

As previously mentioned, the boiling point of n-heptafluorobutyryl fluoride, $CF_3(CF_2)_2COF$, is in the neighborhood of 0° C.

Amides and N-substituted amides

The fluorocarbon acid fluorides react with ammonia ($NH_3$) to form the corresponding fluorocarbon amides, wherein the reactive fluorine atom has been replaced by an amido group ($-NH_2$) as illustrated by:

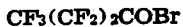

| Amide | Melting Point |
|---|---|
|  | °C. |
| $CF_3(CF_2)_2CONH_2$ | 105 |
| $CF_3(CF_2)_4CONH_2$ | 117 |
| $CF_3(CF_2)_6CONH_2$ | 138 |
| $CF_3(CF_2)_8CONH_2$ | 150 |
| $C_6F_{11}CONH_2$ | 112 |
| $C_6F_{11}CF_2CONH_2$ | 119 |

As an illustration, anhydrous ammonia was bubbled through 100 grams of the cell drainings obtained from the electrolysis of a solution of capric acid in anhydrous HF, keeping the mixture below 10° C. until saturated. The resulting mixture was then heated under vacuum until the accompanying fluorocarbons were removed. The remaining solid material was purified by dissolution in methyl alcohol and recrystallization to obtain 6 grams of a white solid identified as $CF_3(CF_2)_8CONH_2$ (nonadecafluorocapramide).

The n-heptafluorobutyramide compound listed above, $CF_3(CF_2)_2CONH_2$, was found to contain 6.55% nitrogen (Kjeldahl method) in close agreement with the theoretical value of 6.57% for the pure compound. It was readily purified by sublimation at 45–100° C. at atmospheric pressure. The infra-red absorption spectrum indicated the presence of amido and carbonyl groups, and gave no evidence of C—H groups, thereby further substantiating the identification. This compound is soluble in acetone, methanol, ethanol, ether, cold concentrated sulfuric acid and glacial acetic acid. It is insoluble in benzene, heptane and cold water. It reacts with warm ethanolic KOH and evolves $NH_3$. It can be dehydrated with $P_2O_5$ to form the corresponding nitrile. The nitrile can be hydrolyzed in basic solutions to form salts of heptafluorobutyric acid. The nitrile derivative was found to have a molecular weight of 194, in close agreement with the formula weight of 195 for $C_3F_7CN$.

The undecafluorocapramide compound listed above, $CF_3(CF_2)_4CONH_2$, was analyzed by the Kjeldahl method and found to contain 4.41% nitrogen, in close agreement with the theoretical value of 4.47%. The infra-red absorption spectrum showed the presence of amido and carbonyl groups and the absence of C—H groups. It was found to be soluble in acetone, alcohol, ether and 6 N. sodium hydroxide. It was insoluble in water, heptane, benzene and carbon disulfide. It sublimed at 110° C. and melted sharply (capillary tube method) at 117° C.

These detailed identifications of the amide derivatives further substantiate the identification of the fluorocarbon acid fluorides from which they were made and likewise the identification of the other derivatives of the acid fluorides.

The N-substituted amides can be prepared by condensation of the amines and the acid halides. Thus the anilide and parabromoanilide of n-heptafluorobutyric acid can be prepared by the reaction of aniline, and of parabromoaniline, respectively, with n-heptafluorobutyryl fluoride. The formulas of these two compounds are $C_3F_7CONHC_6H_5$ and $C_3F_7CONHC_6H_4Br$, respectively. They are solids and have melting points of 92–93° C. and 105.5–106° C., respectively.

Nitriles

The fluorocarbon nitriles can be obtained from the fluorocarbon amides by dehydration with phosphorous pentoxide ($P_2O_5$). For example, 15 grams of $P_2O_5$ was added to 40 grams of $CF_3(CF_2)_2CONH_2$ and the mixture heated in a flask. A reaction accompanied by the evolution of a gas took place. The gas was condensed in a trap cooled by a solid-$CO_2$/acetone mixture to yield 26 grams of material identified as $CF_3(CF_2)_2CN$ (heptafluorobutyronitrile), having a boiling point of about 5° C.

Esters

The fluorocarbon acid fluorides and chlorides react with the alcohols to form corresponding fluorocarbon esters (primary, secondary and tertiary) which contain the alkyl radical of the alcohol. They can also be formed by reacting primary and secondary alcohols with the fluorocarbon acids in the presence or absence of mineral acid catalyst. The following esters are illustrative:

| Ester | B. P. (°C.) | Ref. In. | Density (g./cc.) |
|---|---|---|---|
| $CF_3(CF_2)_2COOCH_3$ | 80 | 1.293 (at 20° C.) | 1.483 |
| $CF_3(CF_2)_4COOCH_3$ | 122 | 1.297 (at 29° C.) | 1.618 |
| $CF_3(CF_2)_6COOCH_3$ | 158 | 1.304 (at 27° C.) | 1.684 |
| $CF_3(CF_2)_8COOCH_3$ | 193 | 1.308 (at 31° C.) | 1.760 |
| $C_6F_{11}COOCH_3$ | 139 | 1.316 (at 29° C.) | |
| $CF_3(CF_2)_2COOCH(CH_3)_2$ | 106 | 1.310 (at 20° C.) | 1.324 |
| $CF_3(CF_2)_2COOC(CH_3)_3$ | 116 | 1.318 (at 20° C.) | 1.280 |

These esters are relatively insoluble in water, have a limited solubility in xylene, toluene and carbon tetrachloride, and are miscible in all proportions with ethyl ether.

As an illustration, 150 cc. of methyl alcohol was added to 450 grams of the cell drainings obtained from the electrolysis of a solution of capric acid in anhydrous HF, and the mixture was refluxed for four hours. The resultant liquid mixture was washed with water and distilled to give 30 grams of a liquid fraction identified as $$CF_3(CF_2)_8COOCH_3$$

Salts

The alkali salts can be obtained by hydrolysis in base solutions of the previously mentioned fluorocarbon acid fluorides, fluorocarbon amides, and fluorocarbon nitriles. They can also be obtained by reaction of the fluorocarbon acids with bases, oxides and carbonates. The preparation of ammonium and alkali metal salts has been demonstrated by systematic experiments and analysis of products. The salts react with mineral acids to form the corresponding fluorocarbon acids. Alkali, alkaline earth, and polyvalent-metal salts can be formed by direct reaction of the fluorocarbon acids with the elements and with the hydroxides, oxides and carbonates; these acids being very strong in aqueous solutions and readily reacting to form salts in a manner comparable to the mineral acids.

The lithium, sodium and calcium salts of n-heptafluorobutyric acid have been found to be microcrystalline by X-ray analysis, whereas the silver salt is macrocrystalline and the lead salt is amorphous. The lithium, sodium, calcium and lead salts are stable but hygroscopic. The silver salt is unstable towards light and is non-hygroscopic. The sodium salt melts at 245–255° C., the calcium salt melts at a temperature above 355° C. which has not been determined, the lead salt softens at 270° C. but does not melt (being amorphous), and the silver salt decomposes on heating.

Surface active properties

The compounds to which this application relates exhibit amazingly unique surface properties, making them of great interest as surface active agents, as previously pointed out.

For example, the acids are soluble in toluene and greatly modify its surface properties. Thus it has been found that toluene containing 1% of n-heptafluorobutyric acid, $CF_3(CF_2)_2COOH$, will assume an angle of contact to clean glass of almost 90°. The n-heptafluorobutyric acid molecules are adsorbed by the glass and form an interfacial film which the toluene does not wet. These fluorocarbon acids thus serve as anti-wetting agents. No non-fluorocarbon type of toluene-soluble material is known which will cause toluene to show anything but a zero angle of contact. Trifluoroacetic acid does not have this anti-wetting property and in fact tends to destroy the anti-wetting characteristic of the n-heptafluorobutyric acid when present with it.

An example of a use based on this property is the securing of dropwise condensation in heat exchangers, thereby improving heat transfer as compared with that obtained when the condensate wets the heat exchanger surface. A further example is the use of these compounds in interior coatings of containers to provide non-wettable surfaces so that liquid materials can be poured out without leaving a residue. Another example is the treatment of paper and textiles to render them repellent to water, oils and greases; and the use of the present compounds as constituents of repellent coatings for paper and textiles.

An investigation was made of the surface tensions of aqueous solutions of three fluorocarbon acids, and of the potassium salts of two of them, at various concentrations. The table given below shows in the first column the fluorocarbon compounds; in the second column the minimum surface tension of aqueous solutions (there being in each case a particular concentration at which the surface tension was least); and in the third column the surface tension at the concentration at which micelle formation took place (this concentration being given in the fourth column). The concentration at which micelle formation takes place is that concentration of the aqueous solution where the curve of surface tension vs. concentration shows a sharp discontinuity. The measurements were made at 25° C.

| Comp. | Minimum surface tension | Surface tension at micelle formation | Conc. |
|---|---|---|---|
| $CF_3(CF_2)_2COOH$ | 15.5 | 21 | 0.01 mol. per cent. |
| $CF_3(CF_2)_4COOH$ | 16 | 28 | 1.0 wt. per cent. |
| $CF_3(CF_2)_4COOK$ | 19 | 28 | 5.0 wt. per cent. |
| $CF_3(CF_2)_8COOH$ | 16 | 29 | 0.1 wt. per cent. |
| $CF_3(CF_2)_8COOK$ | 18 | 30 | 0.25 wt. per cent. |

The surface tension of water alone, without solute, is 72 dynes/cm.

Thus these fluorocarbon acids and salts are shown to have an almost unbelievable effect on surface properties.

The surface tension of the methyl ester of nonadecafluorocapric acid, $CF_3(CF_2)_8COOCH_3$, is 18.5 dynes/cm. at 25° C. This ester is completely miscible with ethyl ether, and is substantially insoluble in water, at room temperature. Water saturated with the ester (about 0.1%) has a surface tension at 25° of 69 dynes/cm., which is but slightly lower than the value for pure water (72 dynes/cm.). Saturated solutions of this ester in illustrative organic solvents in which the ester has limited solubility, have reduced surface tension values at 25° C. as given below, as compared to the values for the solvents alone:

| Solvent | Surface tension of solvent alone | Surface tension of saturated solution | Conc. |
|---|---|---|---|
| Xylene | 28 | 19 | Per cent 10 |
| Toluene | 28 | 19 | 10 |
| $CCl_4$ | 26 | 19 | 15 |

Electrochemical preparation of the fluorocarbon acid fluorides

The electrochemical process of making the novel fluorocarbon acid fluoride compounds claimed herein has already been briefly described.

A 50-ampere laboratory electrolysis cell is adequate for the production of substantial quantities of acid fluorides and can be readily constructed, using iron plates as cathodes and nickel plates as anodes, arranged in alternating spaced relation so that the distance between adjacent electrode surfaces is of the order of $1/8''$ to $1/4''$. The plates in each group are provided with integral tab portions at the top which are welded to a horizontal cross-bar connector joined to a vertical conductor rod passing through the cover of the cell and insulated and sealed therefrom. The tabs of the respective sets of plates are offset from each other. The cover is a steel plate which is removable and can be bolted to a flange at the top of the cell body which is likewise made of steel. "Teflon" (polytetrafluoroethylene) can be used for sealing the conductor rods and as a gasket for the cover. A cooling jacket is provided to maintain the cell at an operating temperature in the neighborhood of 0° C. (which makes for an atmospheric operating pressure), using a refrigerated aqueous solution of ethylene glycol or methanol as a coolant. A current density of about 20 amperes per sq. ft. of anode surface can be obtained at a cell voltage of less than 8 volts D. C., and a 50-ampere cell can be constructed by using plates of sufficient size and number to provide a total anode operating surface area of about 350 sq. in.

The bottom of the cell is provided with an outlet tube and valve for draining the liquid products which settle. The cover is provided with an inlet tube and valve for charging the cell with the starting compounds; and with an outlet tube for withdrawing the gaseous mixture evolved during electrolysis. This outlet tube connects to a condenser maintained at about minus 40° C. for condensing out the bulk of the HF (which is drained back into the cell), and the gaseous outlet thereof connects to an HF absorber tube containing sodium fluoride pellets for removing remaining traces of HF. The outlet thereof can be connected to a liquid-air trap for freezing out the remaining gas constituents from the hydrogen. These can be separated by fractional distillation, and normally comprise $CO_2$, $OF_2$, oxygen, and various fluorocarbon compounds in addition to the fluorocarbon acid fluoride compound. The latter can also be separated by chemical reaction, as by passing the gas mixture through ammonium hydroxide solution to form the amide, which is a solid compound at room temperature, or through water to form the acid, or through alcohol to form an ester, etc. When butyric acid is used as the starting compound in the cell, most of the fluorocarbon acid fluoride product will volatilize (the boiling point being in the neighborhood of 0° C.) and hence will be recovered from the gas mixture, either directly or in the form of a derivative. The higher-boiling fluorocarbon acid fluoride products will mainly settle to the bottom of the cell and can be drained out in solution with the fluorocarbons which are also formed, and can be separated by fractinal distillation or can be reacted in situ in the mixture to form derivatives, as previously indicated.

The cell charge consists of anhydrous liquid hydrogen fluoride containing the dissolved organic starting compound. The monocarboxylic acids are the preferred starting compounds. A convenient initial ratio is 1 part by weight per 10 parts of HF. It has been found that the ethers and amides can also be employed, but the yields of fluorocarbon acid fluoride products are considerably lower.

As illustrations the following experiments are cited:

(1) A cell of the type described was initially charged with about 1800 grams of anhydrous liquid hydrogen fluoride and 175 grams of benzoic acid. The solution was electrolyzed by passing direct current between the anodes and cathodes at a current density of about 20 amperes per sq. ft., the cell voltage being approximately 5-6 volts during the run. There was no generation of free fluorine. The run was continued for 38 hours with replenishment of the starting compounds. At the end of this period 314 grams of an immiscible liquid product was drained from the bottom of the cell, of which approximately 50% was found to be the fully fluorinated cyclohexyl monocarboxylic acid fluoride, $C_6F_{11}COF$, undecafluorocyclohexylyl fluoride.

(2) In a similar experiment using phenylacetic acid, 82 grams of liquid material was drained from the cell after 38 hours of operation, and was found to contain tridecafluorocyclohexyl acetyl fluoride. Anhydrous ammonia was bubbled through this material to produce 27 grams of a white solid material which was separated out and purified by recrystallization (using methanol as the solvent). It was identified as the fully fluorinated cyclohexylacetamide, $C_6F_{11}CF_2CONH_2$.

(3) In an experiment using n-butyric acid as the organic starting compound, an iron-cathode nickel-anode pilot plant cell was employed which had an anode surface area of about 110 sq. ft., and which was operated at atmospheric pressure and at a cell temperature of about 5° C. The cell was initially charged with 325 lbs. of anhydrous liquid hydrogen fluoride and 25 lbs. of the butyric acid, both of which were replenished during the 223 hour run to maintain operating conditions. The average concentration of butyric acid during the run was 5.6%. The cell voltage averaged 6.0 volts and the average current was 1820 amperes, the average current density being about 17 amps./sq. ft. The cell gases were led through a low-temperature condenser (the temperature of which varied from about minus 10 to about minus 80° C., the average being about minus 50° C.), to condense out the bulk of the HF which was drained back to the cell. The exit gas mixture, warmed to about room temperature, was passed through an ammonia bubbler where an ammonolysis reaction occurred with the n-heptafluorobutyryl fluoride, $CF_3(CF_2)_2COF$, contained in the gas mixture, to form the corresponding amide, $CF_3(CF_2)_2CONH_2$, which precipitated out. The ammonia bubbler contained about 40 lbs. of water in which sufficient anhydrous ammonia was dissolved to produce a pH value of about 10, and ammonia was added from time to time to maintain this alkalinity volume. The bubbler was maintained at about room temperature by a cooling water jacket. The gas mixture also contained HF which reacted to form ammonium fluoride, and $CO_2$ which reacted to form ammonium carbonate. The solid precipitate produced in the bubbler formed a slurry with the liquor, and this slurry was periodically drained from the bottom and make-up water was added to maintain the liquid level. A total of about 35 lbs. of crude amide precipitate was recovered. This was dissolved in methanol and filtered. The clear liquor was treated with water to precipitate the amide, which was separated by filtration to yield, upon drying, about 17 lbs. of pure n-heptafluorobutyramide, $CF_3(CF_2)_2CONH_2$.

The cyclic acids are claimed in our divisional application, Serial No. 233,952, filed June 27, 1951.

Having described various exemplary compounds of this invention for purposes of illustration rather than limitation, what we claim is as follows:

1. As a new and useful reactive fluorocarbon compound, n-heptafluorobutyryl fluoride, having the formula: $CF_3(CF_2)_2COF$.

2. As a new and useful reactive fluorocarbon compound, n-heptafluorobutyric acid, having the formula: $CF_3(CF_2)_2COOH$.

3. As a new and useful reactive fluorocarbon compound, n-heptafluorobutyramide, having the formula: $CF_3(CF_2)_2CONH_2$.

4. The alkali-metal salts of n-heptafluorobutyric acid.

5. The alkyl esters of n-heptafluorobutyric acid.

6. The fluorocarbon compounds of the class consisting of the fully fluorinated saturated non-cyclic monocarboxylic acids which have from four to ten carbon atoms in the molecule and are represented by the formula $C_nF_{2n+1}COOH$, and their anhydrides, acid halides, amides, anilides, parabromoanilides, nitriles, alkyl esters, and metal and ammonium salts; these derivatives being hydrolyzable to form said acids.

ALBERT R. DIESSLIN.
EDWARD A. KAUCK.
JOSEPH H. SIMONS.

REFERENCES CITED

The following references are of record in the file of this patent:

UNITED STATES PATENTS

| Number | Name | Date |
|---|---|---|
| 2,371,757 | Henne | Mar. 20, 1945 |
| 2,396,076 | Benning et al. | Mar. 5, 1946 |
| 2,411,158 | Handford | Nov. 19, 1946 |
| 2,414,706 | Babcock et al. | Jan. 21, 1947 |
| 2,447,717 | Simons | Aug. 24, 1948 |
| 2,456,768 | Chaney | Dec. 21, 1948 |

OTHER REFERENCES

Editors, Ind. and Eng. Chem., vol. 39, p. 242 (1947).

McBee et al., Ind. and Eng. Chem., vol. 39, pp. 415–417 (1947).